(12) United States Patent
Delgado Acarreta et al.

(10) Patent No.: US 11,067,367 B2
(45) Date of Patent: Jul. 20, 2021

(54) WEAPON COMMUNICATION METHOD AND SYSTEM

(71) Applicant: RADE TECNOLOGÍAS, S.L., Saragossa (ES)

(72) Inventors: Raúl Delgado Acarreta, Saragossa (ES); Rubén Robles Pérez, Saragossa (ES); Diego Bernal Somavilla, Saragossa (ES); José Cuesta Álvarez, Saragossa (ES); Daniel Osuna Sanz, Saragossa (ES); Eduardo Santesteban de la Concepción, Saragossa (ES)

(73) Assignee: RADE TECNOLOGÍAS, S.L., Saragossa (ES)

( * ) Notice: Subject to any disclaimer, the term of this patent is extended or adjusted under 35 U.S.C. 154(b) by 0 days.

(21) Appl. No.: 16/253,983

(22) Filed: Jan. 22, 2019

(65) Prior Publication Data
US 2019/0226810 A1 Jul. 25, 2019

(30) Foreign Application Priority Data
Jan. 22, 2018 (EP) .................................... 18382033

(51) Int. Cl.
*F41G 11/00* (2006.01)
*F41A 35/00* (2006.01)
*F41C 23/16* (2006.01)
*H04L 29/08* (2006.01)

(52) U.S. Cl.
CPC ............ *F41G 11/003* (2013.01); *F41C 23/16* (2013.01); *H04L 67/322* (2013.01); *H04L 67/12* (2013.01)

(58) Field of Classification Search
CPC ......... F41G 11/003; F41G 1/35; F41C 223/16
See application file for complete search history.

(56) References Cited

U.S. PATENT DOCUMENTS

| 5,669,174 | A | * | 9/1997 | Teetzel | ...................... | F41A 9/62 |
|---|---|---|---|---|---|---|
| | | | | | | 356/5.01 |
| 5,822,905 | A | * | 10/1998 | Teetzel | ..................... | F41C 23/16 |
| | | | | | | 42/117 |
| 5,903,735 | A | * | 5/1999 | Kidder | .................... | H04L 29/06 |
| | | | | | | 370/233 |
| 6,732,185 | B1 | * | 5/2004 | Reistad | ................. | G06Q 10/107 |
| | | | | | | 379/88.22 |

(Continued)

FOREIGN PATENT DOCUMENTS

| WO | 2012109746 | 8/2012 |
|---|---|---|
| WO | 2015031993 | 3/2015 |

*Primary Examiner* — Derrick R Morgan
(74) *Attorney, Agent, or Firm* — Carmody Torrance Sandak & Hennessey LLP (57) ABSTRACT

Communication method and system for bidirectional data transfer among smart modules (101-111) attachable to a weapon (100), where messages are encoded by modulating an electric supply provided by at least one powered rail (200, 200', 200", 200'''). At least two priority levels are defined among smart modules supplied by the powered rail (200, 200', 200", 200'''). High-priority smart modules (600) are allowed to transmit high-priority data message (741) directly; whereas low-priority smart modules (500) are required to transmit a data transfer request message (723) and wait for a data transfer permission message (731), which is only sent when no high-priority data message (741) is being received.

17 Claims, 5 Drawing Sheets

(56) References Cited

U.S. PATENT DOCUMENTS

| | | | |
|---|---|---|---|
| 7,287,087 B1* | 10/2007 | Bush | H04L 47/10 370/412 |
| 7,559,167 B1* | 7/2009 | Moody | F41C 23/16 42/71.01 |
| 7,627,975 B1* | 12/2009 | Hines | F41G 11/003 42/84 |
| 7,784,390 B1* | 8/2010 | Lowell | F41C 7/00 42/1.08 |
| 7,819,547 B1* | 10/2010 | Teetzel | F21V 23/0414 362/110 |
| 8,091,265 B1* | 1/2012 | Teetzel | F41C 23/16 42/124 |
| 8,303,421 B1* | 11/2012 | Farley | A63F 9/02 434/11 |
| 8,397,418 B2* | 3/2013 | Cabahug | F41C 23/22 42/85 |
| 8,448,368 B2 | 5/2013 | Cabahug et al. | |
| 8,776,422 B2* | 7/2014 | Dodd | F41C 23/22 42/72 |
| 9,200,867 B1* | 12/2015 | Swan | F41G 11/003 |
| 9,605,926 B1* | 3/2017 | Means | F41G 3/2655 |
| 9,696,111 B2* | 7/2017 | Saadon | F41C 23/14 |
| 2002/0083148 A1* | 6/2002 | Shaw | H04L 29/06 709/214 |
| 2004/0017817 A1* | 1/2004 | Jameson | H04L 67/12 370/400 |
| 2007/0202468 A1* | 8/2007 | Iwasawa | F41G 1/35 434/21 |
| 2009/0300963 A1* | 12/2009 | Hines | F41C 23/22 42/75.03 |
| 2010/0031552 A1* | 2/2010 | Houde-Walter | F41C 23/16 42/72 |
| 2010/0180485 A1* | 7/2010 | Cabahug | F41C 27/00 42/90 |
| 2010/0192443 A1 | 8/2010 | Cabahug et al. | |
| 2010/0192448 A1* | 8/2010 | Darian | F41C 27/00 42/84 |
| 2010/0218410 A1* | 9/2010 | Cabahug | F41C 23/16 42/71.01 |
| 2010/0242332 A1* | 9/2010 | Teetzel | F41G 11/003 42/72 |
| 2010/0279544 A1* | 11/2010 | Dodd | F41C 23/22 439/533 |
| 2010/0287809 A1* | 11/2010 | Williams | F41G 11/003 42/90 |
| 2011/0000120 A1* | 1/2011 | Thompson | F41G 11/003 42/84 |
| 2011/0010979 A1* | 1/2011 | Houde-Walter | F41C 23/22 42/84 |
| 2011/0131858 A1* | 6/2011 | Darian | F41G 11/003 42/90 |
| 2011/0173865 A1 | 7/2011 | Compton et al. | |
| 2011/0181238 A1* | 7/2011 | Soar | H02J 5/005 320/108 |
| 2012/0055061 A1* | 3/2012 | Hartley | F41C 23/16 42/84 |
| 2012/0078440 A1* | 3/2012 | Oravis | F41G 3/22 701/1 |
| 2012/0153740 A1* | 6/2012 | Soar | H02J 7/025 307/104 |
| 2012/0192476 A1* | 8/2012 | Compton | H04B 5/0037 42/84 |
| 2012/0204466 A1* | 8/2012 | Bayne | F41H 13/0018 42/84 |
| 2012/0269154 A1* | 10/2012 | Wang | H04W 72/1284 370/329 |
| 2013/0061504 A1* | 3/2013 | Malherbe | F41G 11/003 42/84 |
| 2013/0194769 A1* | 8/2013 | Belack | F41A 35/00 361/807 |
| 2013/0337415 A1* | 12/2013 | Huet | F41G 3/2616 434/21 |
| 2014/0047754 A1* | 2/2014 | Compton | F41G 11/00 42/84 |
| 2014/0059911 A1* | 3/2014 | Oh | F41C 23/16 42/16 |
| 2014/0110482 A1* | 4/2014 | Bay | F41G 1/44 235/404 |
| 2014/0130392 A1* | 5/2014 | Oh | F41C 23/22 42/84 |
| 2015/0020427 A1* | 1/2015 | Compton | H02J 50/12 42/71.01 |
| 2015/0041538 A1* | 2/2015 | Teetzel | F41G 1/36 235/404 |
| 2015/0241166 A1* | 8/2015 | Hines | F41G 11/003 42/75.02 |
| 2015/0300786 A1* | 10/2015 | Downing | F41G 3/02 235/404 |
| 2016/0211095 A1* | 7/2016 | Zimmer | F41C 27/00 |
| 2016/0327371 A1* | 11/2016 | Teetzel | F41G 11/003 |
| 2016/0377383 A1* | 12/2016 | Downing | F41G 11/003 42/111 |
| 2018/0139645 A1* | 5/2018 | Yu | G06F 9/5011 |
| 2018/0364008 A1* | 12/2018 | Summerfield | F41G 1/44 |
| 2019/0049221 A1* | 2/2019 | Zimmer | F41G 11/003 |
| 2019/0107370 A1* | 4/2019 | Galli | F41G 11/003 |
| 2019/0154381 A1* | 5/2019 | Goldstein | F41A 17/06 |
| 2019/0165343 A1* | 5/2019 | Jernigan | H01M 2/1022 |
| 2019/0186868 A1* | 6/2019 | Cordero Pardo | F41C 33/029 |
| 2019/0242674 A1* | 8/2019 | Berean | F41G 11/003 |
| 2019/0249958 A1* | 8/2019 | Teetzel | F41A 17/06 |
| 2019/0295404 A1* | 9/2019 | Schuler | G08B 21/18 |
| 2019/0353462 A1* | 11/2019 | Neal | F41G 11/003 |
| 2020/0033096 A1* | 1/2020 | Sabaldan Elpedes | F41G 1/30 |
| 2020/0117900 A1* | 4/2020 | Deng | G06K 9/00671 |

\* cited by examiner

WEAPON COMMUNICATION METHOD AND SYSTEM

FIELD OF THE INVENTION

The present invention has its application within the weapon sector, and more specifically, in providing communication links between smart modules attached to the weapon.

Background of the Invention

Nowadays, smart modules for enhancing precision, control, security and overall performance of weapons are highly sought after. To name a few examples, external infrared and visible light cameras, thermometers, accelerometers, shooting counters, flashlights, lasers, or electromagnetic blocking devices have been specifically developed and adapted for the weapon sector. However, as the number of modules attached to a single weapon increases, the task of powering and controlling said modules becomes increasingly challenging.

One of the preferred approaches in order to provide electric supply to smart modules attached to a weapon are powered rails. In a known manner, these powered rails are integrated or attached to an exterior surface of a gun or weapon, where smart modules can be coupled both mechanically and electrically at any position of the rail. For example, patent document U.S. Pat. No. 7,627,975-B1 discloses an electrified handguard for firearms which comprises a powered rail where modules can be attached in order to receive their required power supply. Said power supply is obtained from a battery directly connected to the rail, or from any alternative power source located elsewhere, such as in a buttstock assembly. However, despite providing a solution to the energetic need of the modules, this approach does not provide any control over said modules; that is, once powered, the user is required to operate each module manually, greatly limiting their performance.

A possible alternative would be to establish communication links between said modules and a central control module capable of turning them on and off, configure them, and extract any desired information from them. However, these modules are not integrated in the firearm itself, but attached and detached thereto depending on the desired firearm configuration, which leads to either an external wired communication link or a wireless communication link. In the first case, communication wires are susceptible to physical damage, and may hinder manual operation of the firearm. In the second case, wireless links are susceptible to accidental or malicious interferences, posing a security threat. Therefore, none of these solutions is fully suitable for this scenario.

In order to solve these limitations, solutions based on Power Line Communications (PLC) have been proposed; that is, instead of providing energy supply and data communications via two separate media, in PLC-based solutions the powered rail provides both energy supply and data communications by encoding messages in a modulated energy signal. For example, patent documents U.S. Pat. No. 8,776,422-B2 and US-2010/0192443-A1 propose an accessory rail which provides both power supply and communication capabilities. A central control operates as master, whereas the rest of smart modules act as slaves of the communication link. In order to increase the number of attachable devices, a particular geometry is proposed for the rail, comprising electrical and mechanical contacts in four perpendicular surfaces around the weapon barrel.

Patent document U.S. Pat. No. 8,448,368-B2 presents a possible configuration for implementing mechanical and electrical coupling. In particular, mechanical coupling is achieved by means of retracting elements attachable to lateral protuberances of the rail; electrical coupling is achieved by means of retractable contacts and complementary push-button contacts with return springs. Pierceable contact seals may be added to the push-button contacts for enhanced protection. Alternative geometries for powered rails with communication capabilities may be found, for example, in US 2013/0061504 A1 and US 2011/0173865 A1.

However, regardless of the particular geometry and the communication protocol of the powered rail, some challenges arise as the number of attached modules increases. Firstly, the physical space limitation itself, both because of the limited space within the rail and because certain modules need to be positioned in specific different locations within the weapon. Secondly, because a greater number of devices share the same physical medium for their communications, coordinating all messages becomes progressively difficult, and may lead to data loss and/or to undesired delays in the transmission of messages, which situation may be worse in case of a critical message. Therefore, there is still a need in the state of the art of a joint power and communication solution for weapon modules, capable of scaling the number of connected devices while preserving safety and efficiency.

SUMMARY OF THE INVENTION

The current invention solves all the aforementioned problems by disclosing a PLC-based communication technique for weapons, which provides efficiency and scalability to a high number of attachable and/or integrated smart modules. The proposed approach advantageously combines hardware and software features, namely interconnectable powered rails and a priority-based half-duplex communication protocol.

In the context of the present invention, by weapon it is meant any small arm or light weapon, such as a firearm, gun, shotgun, airgun, machine gun, pistol, rifle, revolver, etc. and also non-lethal weapon or archery weapon.

The present invention relates to a communication system for bidirectional data transfer among smart modules of a weapon, the system comprising:
  at least one powered rail providing an electric supply to at least one smart module; and
  a control module adapted to encode messages by means of modulation of the electric supply.
According to a first aspect of the present invention:
  the at least one powered rail is configured to provide electric supply to at least a first low-priority smart module and a second high-priority smart module; and
  the control module is further configured to:
    receive a data transfer request message from the at least one low-priority smart module;
    receive a high-priority data message from the at least one high-priority smart module; and
    send a data transfer permission message to the at least one low-priority smart module, only if no high-priority data message is being received.

The term "smart module" should be understood as any module attachable to the weapon, or already integrated in said weapon, capable of either automatically retrieving information associated to the weapon, and/or automatically actuating on the configuration or operation of said weapon. Some non-limiting examples of smart modules are external cameras, thermometers, shooting counters or electromagnetic blocking devices, to name a few. Also, the terms "low-priority smart module" and "high-priority smart module" refer to two modules whose communications are given different priorities by the communication system. The particular devices which receive a higher priority in each particular embodiment hence depend on the design of the communication system itself.

The control module, the low-priority smart module and the high-priority smart module all receive the required electric supply from the at least one powered rail (also known as the Picatinny rail), that is, a rail either integrated on an external surface of the weapon, or attachable to said external surface, onto which smart modules can be attached both mechanically and electrically. Communication links are established on the electric supply provided by the powered rail, by means of any Power Line Communications physical layer protocol known in the state of the art, that is, by encoding any transmitted message as a modulation of the electric signal providing electric supply to the attached modules.

In order to prioritize certain smart modules, preventing critical data from being delayed or lost when multiple modules are connected to the same power line, at least two priority-levels with different communication processes are established. That is, for high-priority smart modules, the control module is configured to directly receive data messages without prior request. However, for low-priority smart modules, the control module is configured to receive a data transfer request message, and only grant said request through a data transfer permission message, if no high-priority data message is being received.

In the present text the terms "horizontal", "vertical", "height", "front" or distal, "back" or proximal, etc., refer to a position of the weapon where bullets are shot substantially parallel to the ground.

In order to enable communications among a greater number of smart modules, multiple powered rails may be disposed on the weapon, with physical connections between rails that transfer both the electric supply and any information modulated therein.

In certain embodiments, in which the system in addition to the at least one powered rail further comprises at least another powered rail, the system may further comprise one or more connectors, or the system may further comprise two or more adapter modules.

In case the system further comprises a connector, this connector has a shape configured to electrically connect the at least one powered rail with the at least another powered rail so as to transfer the modulated electric supply between them. This connector may be removably attachable to the weapon.

In some embodiments, the at least one connector has a U-shape, which may be advantageous for providing electric and mechanic connection between powered rails disposed along surfaces within the same area of the weapon (front, middle or rear), these surfaces of the weapon forming a non-zero angle (typically 90°).

The connector may have any other suitable shape for connecting the different powered rails.

In other embodiments, the system includes:
  a first adapter module, attachable to the at least one first powered rail and adapted to transfer the modulated electric supply between the at least one first powered rail and a wired connection (typically, an internal wired connection, tough it can also be an external connection); and
  a second adapter module, attachable to the at least another second powered rail and adapted to transfer the modulated electric supply between the wired connection (internal or external) and the at least another second powered rail.

These adapter modules may be removably attachable to the weapon. The adapter modules provide an advantageous solution when the powered rails to be interconnected are in different areas of the weapon.

According to just described possible (and compatible) embodiments, data retrieved by any smart module attachable to the weapon may be visualized either through a visualization module attached to the weapon, and connected to the control module through the at least one powered rail; or through an external visualization device. In the case of using an external visualization device, the control module comprises wireless communication means adapted to send data to said external visualization device, according to any wireless technology known in the state of the art. Alternatively, the communication means may be integrated in an independent communication module, connected to the control module through the at least one powered rail.

Regarding the power sources which feed the powered rail, several possible options are disclosed:
  An integrated battery in the control module.
  An integrated battery in a smart module.
  An integrated battery in the weapon itself.
  A dedicated battery module, attachable to the powered rail.

More than one of the aforementioned options may be combined within a same embodiment of the system of the invention.

In a second aspect of the present invention, a weapon is disclosed which incorporates any embodiment and/or preferred option of the communication system of the first aspect of the invention. That is, the weapon comprises a control module and at least a powered rail, to which high-priority and low priority smart-modules are attachable. High-priority smart modules are allowed to transmit high-priority data message directly through modulations of the electrical power supply; whereas low-priority smart modules are required to transmit a data transfer request message and wait for a data transfer permission message, which is only sent when no high-priority data message is being received.

In a third aspect of the present invention, a communication method which provides bidirectional data transfer among smart modules attachable to a weapon is disclosed. The method comprises encoding messages on an electric supply signal provided to said smart modules through at least one powered rail, establishing at least two priority levels among the smart devices. For data transmission with a high-priority smart module, the method straightforwardly comprises receiving a high-priority data message without prior request. For data transmission with a low-priority smart module, the method comprises first receiving a data transfer request message, and then sending a data transfer permission message, only if no high-priority data message is being received.

In some embodiments, in order to detect all smart modules connected to the powered rail (or rails), the method further comprises:
  Sending a module discover message through the powered rail.
  Receiving a discover response message from a smart module connected to said rail.
  Sending a joining message, which comprises an address assigned by the method to the detected smart module.

Preferably, receiving (as a response to the joining message) a device type message indicating operational characteristics of the smart module.

Preferably, in order to coordinate communication among smart modules by means of a beacon technique, the method further comprises:

Periodically sending a beacon message through the powered rail.

Receiving either an idle message or the aforementioned data transfer request message, as a response to said beacon message. That is, the smart modules which receive the beacon message, always respond, either by merely acknowledging said beacon message, or by indicating that they need to transfer data.

Preferably, if no response is received from a given smart module to a predefined number of beacon messages, said smart module is considered to be offline. In order for an offline smart module to be incorporated again to the communication, a response to the module discover message needs to be issued.

In a fourth aspect of the present invention, a computer program is disclosed which implements the method of the invention. The computer program comprises computer program code means adapted to perform any embodiment of the method of the invention when run on a computer, a digital signal processor, a field-programmable gate array, an application-specific integrated circuit, a micro-processor, a micro-controller, or any other form of programmable hardware.

Any preferred option or characteristic of a particular embodiment of the system and weapon of the invention may be applied to the method and computer program of the invention, and vice versa.

The disclosed communication method, communication system, weapon and computer program of the invention provide efficient bidirectional communications among smart modules of a weapon, preventing critical information from being delayed or lost even when a high number of modules are connected to the same communication link. Additional advantages and features of the invention will become apparent from the detailed description that follows and will be particularly pointed out in the appended claims.

The different aspects and embodiments of the invention defined in the foregoing can be combined with one another, as long as they are compatible with each other.

Additional advantages and features of the invention will become apparent from the detailed description that follows and will be particularly pointed out in the appended claims.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

Figure 1:
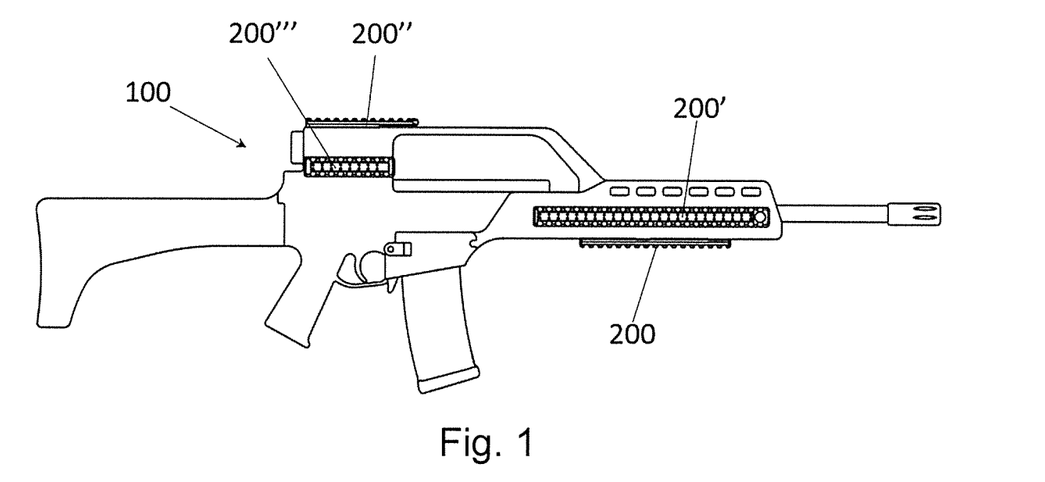
FIG. 1 shows a possible disposition of powered rails on a firearm, according to a preferred embodiment thereof.

FIG. 1 presents a non-limiting example of an application scenario for the invention. A firearm 100 is presented, in this particular case, a H&K G36 rifle. Note, nevertheless, that the present invention may be adapted to any other firearm design.

FIG. 1 presents possible locations of powered rails 200 of a preferred embodiment of the system, method and firearm 100 of the invention, for the particular case of the H&K G36 rifle. The number and position of said powered rails 200 may vary from one implementation to another.

In this case, the firearm comprises six interconnectable powered rails 200:

A first powered rail 200 on the front of the firearm, that is, on the barrel, handguard or forearm of the weapon, facing downwards.

Second and third powered rails 200' (only one of them is shown in this FIG. 1), also on the front of the firearm, displaced vertically from the first powered rail 200, and facing both laterals of the firearm.

A fourth powered rail 200" on the back of the firearm, that is, near the upper receiver or rear sight of the weapon, facing upwards.

A fifth and sixth powered rails 200''' (only one of them is shown in this FIG. 1), also on the back of the firearm, displaced vertically from the fourth powered rail 200", and facing both laterals of the firearm.

Figure 2:
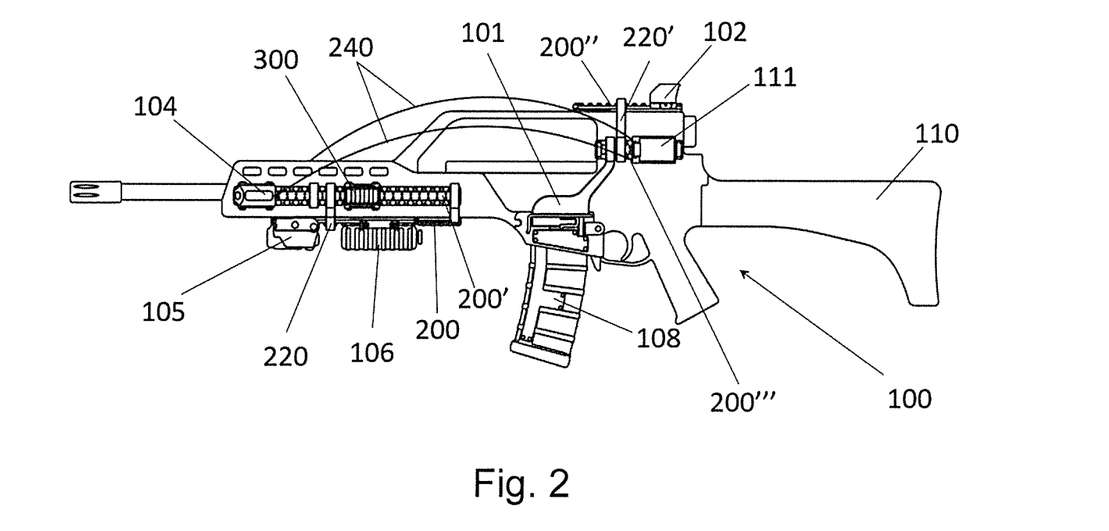
FIG. 2 presents a schematic left-side view of the connections between modules of the firearm, according to a preferred embodiment of the invention.
Figure 3:
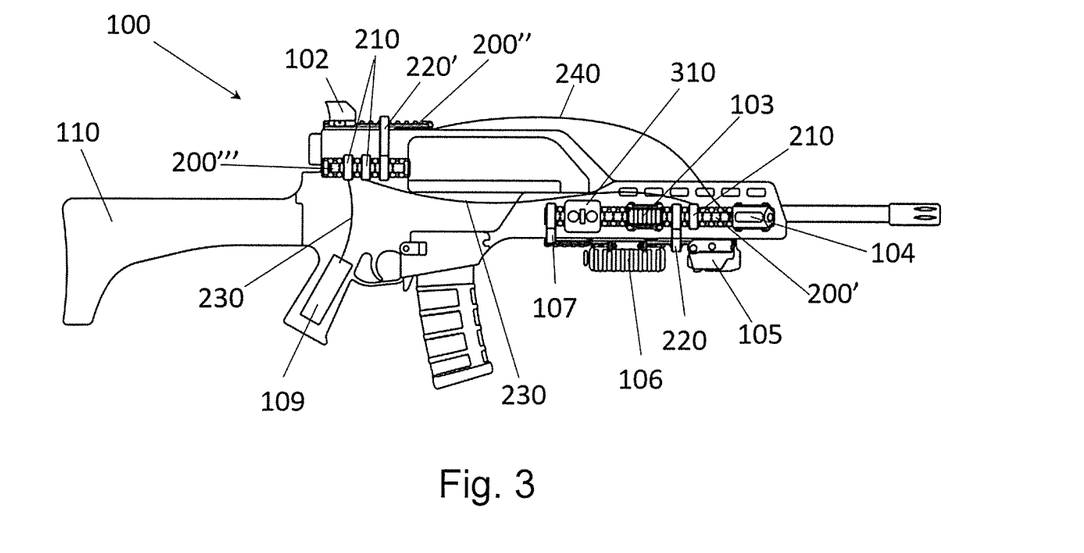
FIG. 3 presents a schematic right-side view of the connections between modules of the firearm, according to a preferred embodiment of the invention.

FIGS. 2 and 3 show the location of some integrated and attachable smart modules that need to be supplied with electricity and communication links. In the presented embodiment, the smart modules are the following:

Cartridge-in-chamber detection 101: this module informs the user of whether there is a cartridge already disposed in the chamber at any given moment.

User interface 102: this module displays the information gathered from all the smart modules in one or more screens. It may also include means for inputting commands toward said modules, such as buttons or tactile screens.

Shot counter 103: this module tracks the number of rounds/cartridges shot by the firearm, both as a partial or total number. It may provide either an ascending or descending count.

Integrated cameras 104: this module, typically located on both sides of the barrel, captures images outside of the area pointed by the firearm. The wavelength range, zoom, etc. may vary between embodiments. Furthermore, the information captured by the integrated cameras may be displayed in dedicated screens, such as the user display 111; it some case it could also be integrated in the general user interface 102.

Shot direction 105: a typical feature in shooting ranges, this module automatically locks the weapon when pointing outside a dedicated practice area.

Auxiliary power supply 106: this passive module provides electric energy to the rest of smart modules, typically as a complement to other energy sources such as batteries integrated in said modules or in the firearm itself.

Temperature detection 107: one or more thermometers provide real-time information of the temperature at critical parts of the firearm, raising an alarm if any of the measured temperatures exceed a security threshold.

Smart magazine 108: this module provides real-time information of the number of cartridges currently stored in the magazine.

Electromagnetic lock 109: this module prevents cartridges from being fired accidentally (when activated by the user that carries the firearm or, remotely, by another controlling user), or outside designated areas (when activated by the shot direction 105 module).

Buttstock assembly with integrated battery 110: similar to the auxiliary power supply 106, this module provides energy supply to the rest of the modules. However, in this case, the battery is integrated in a designated assembly in the buttstock of the weapon.

User display 111: this module, which can be attached to a lateral rear powered rail (the fifth or sixth power rails 200'''), shows the information captured the integrated cameras 104.

The aforementioned modules are merely some non-limiting examples, and any other smart module known in the firearm field may be attached to (and controlled by) the system of the invention.

As shown in FIGS. 2 and 3, the aforementioned smart modules are attached to the different powered rails 200, 200', 200", 200''', at different locations. FIGS. 2 and 3 also show the interconnection of said powered rails 200. In order to connect two or more powered rails whose extension partially or fully overlaps in the horizontal direction (that is, in the present example, the first powered rail 200 with the second and third powered rails 200', or the second and the third powered rails 200' between each other), the system comprises a plurality of connectors 220. Whereas to connect a frontal powered rail (any of the first powered rail 200, the second and the third powered rails 200') and a rear powered rail (any of the fourth powered rail 200", the fifth and the sixth powered rails 200'''), that is, in order to connect two or more powered rails which are horizontally separate, the system comprises a plurality of adapter modules 210. Each connector 220 has a U-shaped form adapted to simultaneously interconnect three powered rails 200, both mechanically and electrically. Each adapter module 210 is configured to be electrically and mechanically coupled to a single powered rail 200, transferring any modulated power supply signal between said powered rail 200 and a wired connection 230.

In this particular example, a first connector 220 connects the frontal powered rails, that is, the first powered rail 200, and the second and third powered rails 200'; and a second connector 220' connects the rear powered rails, that is, the fourth powered rail 200", and the fifth and sixth powered rails 200'''.

Connection between the rear and frontal regions within the firearm 100 is achieved through a wired connection between adapter modules 210 connected to a lateral front powered rail (that is, the second and third powered rails 200') and a lateral rear powered rail (that is, the fifth and sixth powered rails 200'''). Furthermore, wired connections starting at adapter modules 210 attached to a lateral rear powered rail 200''' connect said powered rail 200 with the buttstock assembly with the integrated battery 110 and the smart magazine 108. Note that the wired connections are internal, and are thus not shown in the Figures.

Two integrated cameras 104 are attached to the lateral frontal powered rails, that is, the second and third powered rails 200', whereas the shot direction 105 module, the auxiliary power supply 106 and the temperature detection 107 module are attached to the bottom frontal powered rail or first powered rail 200. The shot counter 103 module is attached to one of the lateral frontal powered rails 200' (see. FIG. 3). Finally, the user interface 102 is attached to the upper rear powered rail or fourth powered rail 200", and a user visor 111 is attached to a lateral rear powered rail, or fifth/sixth powered rails 200'''. In addition to the PLC connection provided by the communication system, a dedicated connection 240 between the user visor 111 and the integrated cameras 104 is provided.

All PLC communications among modules connected to the powered rails 200 are controlled by a control module 300, which in this particular example is mechanically and electrically coupled to a lateral frontal powered rail 200. The control module 300, which implements the steps of the method and computer program of the invention, is configured to perform half-duplex communications in a master-slave configuration with at least two priority levels. Said control module 300 may also comprise wireless communication means that connect the communication system with external visualization devices. A general control button 310 for the communication system has also been represented in FIG. 3, although any other user interface known in the state of the art may be implemented.

Figure 4:
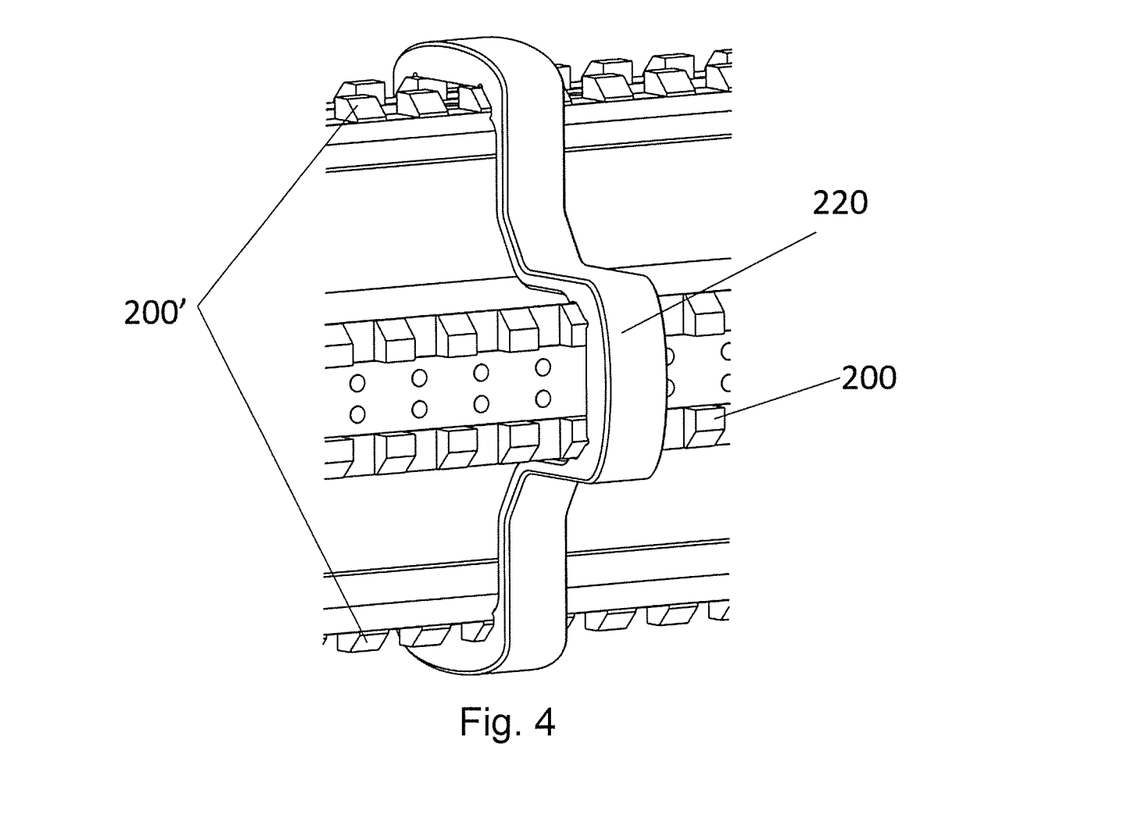
FIG. 4 shows in greater detail a preferred embodiment of a vertically-disposed connectors that transfer the modulated electric supply between powered rails.

FIG. 4 shows in greater detail a connector 220, 220' which simultaneously couples the energy supply signal between two or more three powered rails 200. In the present example, each connector 220, 220' has a U-shaped form adapted to simultaneously interconnect three powered rails 200, both mechanically and electrically. The U-shape connector comprises three pairs of wired contacts. Each end of the U-shaped connector 220, 220' is mounted on a crosswise slot of a powered rail which is laterally mounted (in the present example, any of the second and third powered rails 200", and the fifth and the sixth powered rails 200'''); and a central portion of the U-shaped connector 220 is mounted on a crosswise slot of a powered rail which is horizontally mounted (in the present example, any of the first upper powered rail 200, and the fourth lower powered rail 200").

Though not shown in the Figures, this connector may have another shape for interconnecting powered rails disposed along the same surface at different positions along the weapon.

Figure 5:
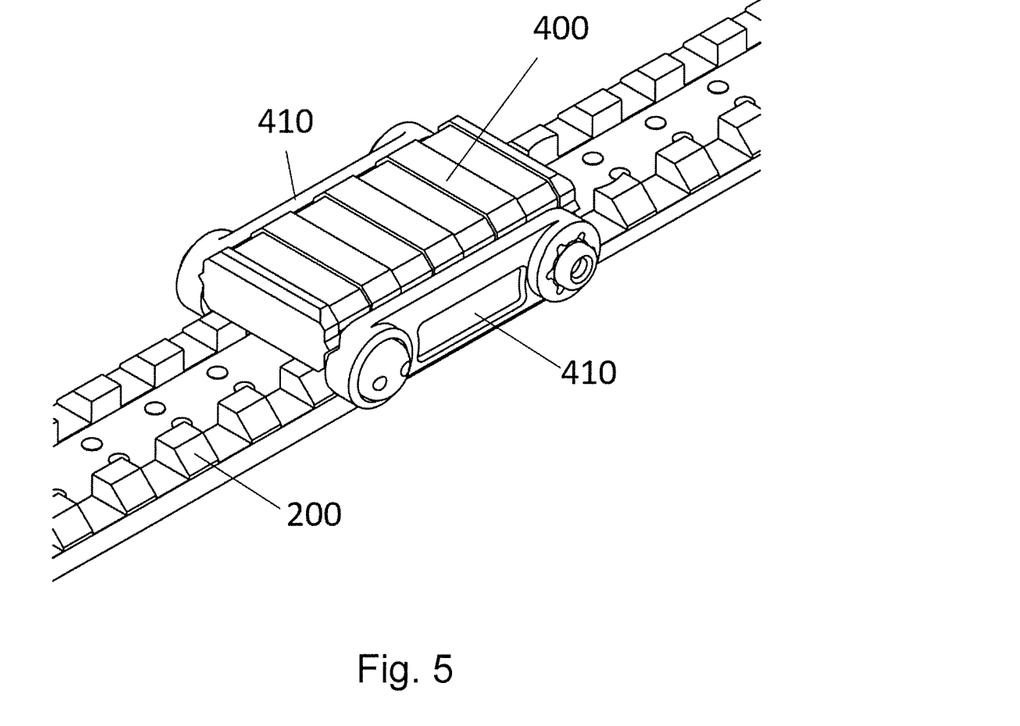
FIG. 5 illustrates a possible technique for attaching the smart modules and the control module to the powered rails, according to a preferred embodiment of the invention.
Figure 6:
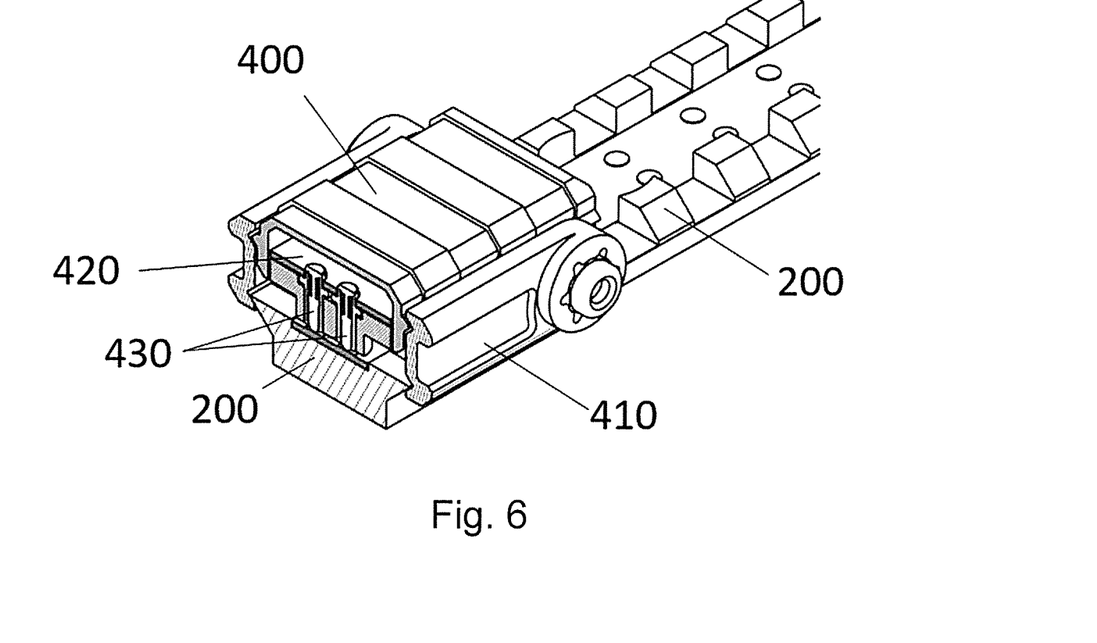
FIG. 6 is a schematic section view of the same technique for attaching the smart modules and the control module to the powered rails, according to a preferred embodiment of the invention.

FIGS. 5 and 6 present a perspective view and a section view, respectively of a preferred embodiment of the control module 300 of the invention. Note that the same technique for electrical and mechanical coupling may be applied to the rest of the smart modules, although any other alternative technique known in the state of the art for powered rails may be applied. Externally, the control module 300 comprises a main body 400 with two lateral segments 410. Said lateral segments 410 are mechanically attached to the powered rail 200, 200', 200", 200''' by being placed on both sides of said powered rail and tightened by bolts or other alternative fixing mechanism. Internally, the control module 300 comprises two pogo pin connectors 430 which make contact with complementary contacts points of the powered rail 200. When connected in said contacts, the pogo pin connectors 430 transfer the modulated energy supply signal between a conducting track of the powered rail 200, 200', 200", 200''' and the chip 420 where the computer program of the invention is stored and executed.

FIGS. 7 to 10 illustrate the messages exchanged between the control module 300 and the smart modules attached to the powered rails 200, 200', 200", 200''', according to the step of a particular embodiment of the method of the invention, which are also implemented by a particular embodiment of the control module 300 of the invention. In this example, a low-priority smart module 500 and a high-priority smart module 600 have been included, although the process is applicable to any number of smart modules. Also notice that a given module may act as a low-priority smart module 500 or a high-priority smart module 600 in different occasions, depending on the priority of the information that needs to be transmitted.

Although the particular message encoding may vary between embodiments, the following fields are recommended:
  Header: fixed code to indicate the beginning of the message.
  Type: a code indicating a device type of the emitter.
  Address: address of the device or devices to which the message is sent. Addresses are assigned by the control module 300 as detailed later in this description.
  Command: a code indicating a type of command. In the following examples, the command types DISCOVER, BEACON, READ, WRITE and EXPRESS are considered.
  Parameter: the interpretation of this field varies depending on the type of command. For example, parameter field of a DISCOVER command may either be empty, indicate that a new device has been discovered (NEW DEVICE), indicate that a new device has been joined (JOINED), or indicate the device type of the joined device (DEVICE TYPE). Parameter field of a BEACON command may either ask for a status update (STATUS), indicate an idle status (IDLE), or indicate that data needs to be sent (NEW DATA). Parameter field of a READ or WRITE command may be empty or indicate that data is enclosed (DATA TYPE). Parameter field of a EXPRESS command, may indicate that data is enclosed (DATA TYPE) or acknowledge correct message reception (ACK).
  Data: data included in READ, WRITE and BEACON messages.
  Checksum: parity byte for verifying correct reception of the message.

Figure 7:
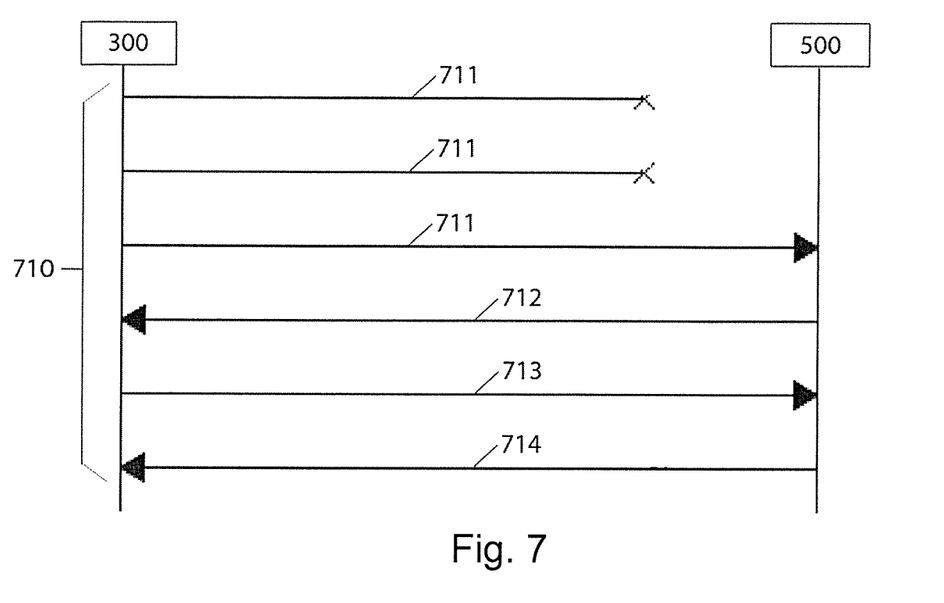
FIG. 7 illustrates the message exchange between the control module and a slave module during discovery phase, according to a preferred embodiment of the method of the invention.

FIG. 7 illustrates the discovery process 710, initiated by the control module 300, which acts as master:
  A module discover message 711 is periodically sent by the control module 300, that is, a message with a DISCOVER command and an empty parameter field.
  When the module discover message 711 is received by the smart module (in this example, it is a low-priority smart module 500 but the process is the same for a high-priority smart module 600), said module responds with a discover response message 712, that is, a message with a DISCOVER command and a NEW DEVICE parameter field.
  Then the control module sends a joining message 713 indicating an address assigned to the smart module, that is, a message with a DISCOVER command and a JOINED parameter field, and the address in the data field. The assigned address must be unique within the data bus.
  Finally, the smart module responds with a device type message 714, indicating operational characteristics of the smart module, that is a message with a DISCOVER command and a DEVICE TYPE parameter field.

Figure 8:
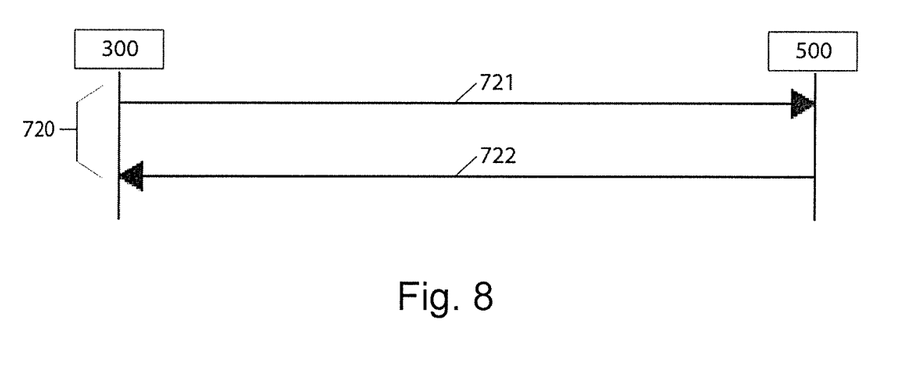
FIG. 8 illustrates the message exchange between the control module and a slave module during beacon phase, according to a preferred embodiment of the method of the invention.

FIG. 8 illustrates the beacon process 720:
  The control module 300 transmits a beacon message 721 asking for status updates from the smart module, that is, a message with a BEACON command and a STATUS parameter field.
  If the low-priority smart module 500 has no data to transmit, an idle message 722 is merely issued, that is a message with a BEACON command and an IDLE parameter field.
  However, if no response to beacon messages 721 is received at the control module after a predefined number of attempts, the module is considered to be offline, until reactivated through the discovery process 710.

Figure 9:
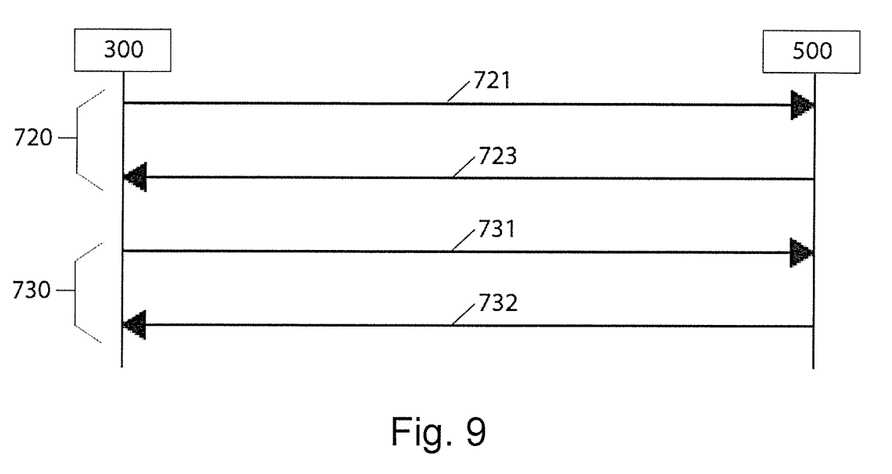
FIG. 9 illustrates the message exchange between the control module and a slave module during reading phase, according to a preferred embodiment of the method of the invention.

FIG. 9 illustrates a reading process 730, which is also applicable mutatis mutandis to a writing process:
  The process starts as a response to a beacon message 721 issued by the control module 300, but in this case, the low-priority smart module 500 responds with a data transfer request message 723, that is a message with a BEACON command and an NEW DATA parameter field.
  If no higher-priority communication is taking place, the control module 300 grants permission through data transfer permission message 731, that is, a message with a READ command and an empty parameter field.
  When grant permission, the low-priority smart module 500 responds with a data message 732, that is, a message with a READ command, a DATA TYPE parameter field and the data to send in the data field.

Figure 10:
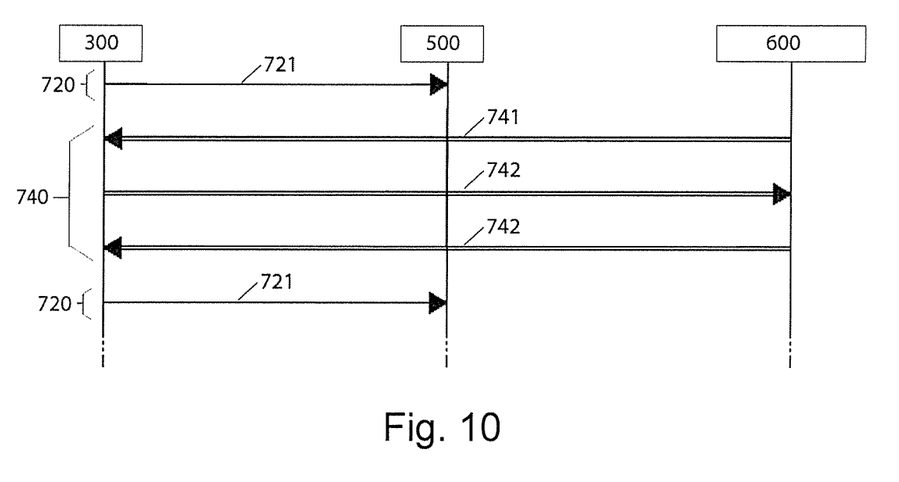
FIG. 10 illustrates the message exchange between the control module, a low-priority slave module and a high-priority slave module during high-priority communication phase, according to a preferred embodiment of the method of the invention.

Finally, FIG. 10 illustrates a high priority communication process 740 in the presence of a low-priority smart module 500 and a high-priority smart module 600:
  A high-priority data message 741 from the high-priority smart module 600 interrupts the regular beacon process 720 and read process 730. That is, a message with a EXPRESS command, a DATA TYPE parameter field, and data to send already enclosed.
  If received correctly, first the control module 300 and then the high-priority smart module 600 respond with an acknowledgment message 742, that is a EXPRESS command with an ACK parameter field.

With this method, any unnecessary delays in the transmission of critical information is prevented, regardless of the number of modules connected to the same powered rail (or rails), enabling system efficiency and scalability.

In this text, the term "comprises" and its derivations (such as "comprising", etc.) should not be understood in an excluding sense, that is, these terms should not be interpreted as excluding the possibility that what is described and defined may include further elements, steps, etc. Furthermore, In the context of the present invention, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, design decisions not related to the invention, etc. The same applies to the terms "about" and "around" and "substantially".

The invention claimed is:

1. A communication system for bidirectional data transfer among smart modules attachable to a weapon, comprising:
    at least one powered rail providing an electric supply to at least one smart module; and
    a control module adapted to encode messages by modulation of the electric supply;
the at least one powered rail being configured to provide electric supply to at least a first low-priority smart module and a second high-priority smart module, and
wherein the control module being further configured to:
    receive a data transfer request message from the at least one low-priority smart module;
    receive a high-priority data message from the at least one high-priority smart module without receiving a prior request of transfer of the high-priority data message; and
    send a data transfer permission message to the at least one low-priority smart module, only if no high-priority data message is being received.

2. A communication system according to claim 1, wherein the system further comprises:
    at least another powered rail; and
    at least one connector having a shape configured to electrically connect the at least one powered rail with the at least another powered rail so as to transfer the modulated electric supply between the first powered rail and the second powered rail.

3. A communication system according to claim 1, wherein the system further comprises:
    at least another powered rail;
    a first adapter module, attachable to the at least one powered rail and adapted to transfer the modulated electric supply between the at least one powered rail and a wired connection; and
    a second adapter module, attachable to the at least another powered rail and adapted to transfer the modulated electric supply between the wired connection and the at least another powered rail.

4. A communication system according to claim 1, wherein the system further comprises a user interface, connected to the control module through the at least one powered rail.

5. A communication system according to claim 1, wherein the control module further comprises wireless communication system configured to send data to an external visualization device.

6. A communication system according to claim 1, wherein the control module further comprises an integrated battery which supplies power to the at least one powered rail.

7. A communication system according to claim 1, wherein the system further comprises an auxiliary power supply module connectable to the at least one powered rail, which supplies power to said at least one powered rail.

8. A communication system according to claim 1, wherein the system further comprises a smart module with an integrated battery which supplies power to the at least one powered rail.

9. A communication system according to claim 1, wherein the at least one low-priority smart module is required to transmit a data transfer request message and wait for a data transfer permission message, wherein the data transfer permission message is only sent if no high-priority data message is being received.

10. A weapon comprising:
    at least one smart module;
    at least one powered rail providing an electric supply to the at least one smart module; and
    a control module adapted to encode messages by modulation of the electric supply;
a communication system for bidirectional data transfer among smart modules attachable to a weapon, comprising:
    at least one powered rail providing an electric supply to at least one smart module; and
    a control module adapted to encode messages by modulation of the electric supply;
the at least one powered rail being configured to provide electric supply to at least a first low-priority smart module and a second high-priority smart module, and
the control module being further configured to:
    receive a data transfer request message from the at least one low-priority smart module;
    receive a high-priority data message from the at least one high-priority smart module without receiving a prior request of transfer of the high-priority data message; and
    send a data transfer permission message to the at least one low-priority smart module, only if no high-priority data message is being received.

11. A weapon according to claim 10, wherein the system further comprises:
    at least another powered rail; and
    at least one connector having a shape configured to electrically connect the at least one powered rail with the at least another powered rail so as to transfer the modulated electric supply between the first powered rail and the second powered rail.

12. A weapon according to claim 10, wherein the system further comprises:
    at least another powered rail; and
    a first adapter module, attachable to the at least one powered rail and adapted to transfer the modulated electric supply between the at least one powered rail and a wired connection; and
    a second adapter module, attachable to the at least another powered rail and adapted to transfer the modulated electric supply between the wired connection and the at least another powered rail.

13. A weapon according to claim 10, wherein the system further comprises a user interface, connected to the control module through the at least one powered rail.

14. A weapon according to claim 10, wherein the control module further comprises wireless communication system configured to send data to an external visualization device.

15. A weapon according to claim 10, wherein the control module further comprises an integrated battery which supplies power to the at least one powered rail.

16. A weapon according to claim 10, wherein the system further comprises a smart module with an integrated battery which supplies power to the at least one powered rail.

17. A weapon according to claim 10, wherein the at least one low-priority smart module is required to transmit a data transfer request message and wait for a data transfer permission message, wherein the data transfer permission message is only sent if no high-priority data message is being received.

* * * * *